US012254790B2

(12) United States Patent
Jones

(10) Patent No.: US 12,254,790 B2
(45) Date of Patent: Mar. 18, 2025

(54) PATCH HANGTAG SYSTEM FOR OUTDOOR EQUIPMENT

(71) Applicant: NOSO, LLC, Jackson, WY (US)

(72) Inventor: Kelli Jones, Jackson, WY (US)

( * ) Notice: Subject to any disclaimer, the term of this patent is extended or adjusted under 35 U.S.C. 154(b) by 155 days.

(21) Appl. No.: 18/133,974

(22) Filed: Apr. 12, 2023

(65) Prior Publication Data

US 2023/0326375 A1 Oct. 12, 2023

Related U.S. Application Data

(60) Provisional application No. 63/330,048, filed on Apr. 12, 2022.

(51) Int. Cl.
*G09F 3/02* (2006.01)

(52) U.S. Cl.
CPC .................................... *G09F 3/02* (2013.01)

(58) Field of Classification Search
CPC ........................................................ G09F 3/02
See application file for complete search history.

(56) References Cited

U.S. PATENT DOCUMENTS

| | | | | |
|---|---|---|---|---|
| 7,373,749 | B1 * | 5/2008 | Lewis | G09F 3/10 40/6 |
| 2006/0080752 | A1 * | 4/2006 | Darling | G09F 3/02 2/48 |
| 2008/0263919 | A1 * | 10/2008 | Halliday | G09F 3/0288 40/299.01 |
| 2011/0289647 | A1 * | 12/2011 | Chiao | B32B 37/02 156/60 |
| 2018/0264781 | A1 * | 9/2018 | Jones | B32B 3/263 |
| 2022/0108633 | A1 * | 4/2022 | Bruno | G09F 3/0297 |

* cited by examiner

*Primary Examiner* — Gary C Hoge
(74) *Attorney, Agent, or Firm* — Dentons Durham Jones Pinegar; Sarah W. Matthews; Lilly Godfrey

(57) ABSTRACT

A system for increasing the life of an outerwear garment or an outdoor dear item with an outerwear garment or an outdoor gear item having an outer layer formed of a first material, a hangtag that is attachable to the garment, the hangtag including a patch made out of the first material, the patch for covering a hole or blemish formed in the outer layer of the outerwear garment of outdoor gear item.

20 Claims, 9 Drawing Sheets

PATCH HANGTAG SYSTEM FOR OUTDOOR EQUIPMENT

CLAIM FOR PRIORITY

The present application claims the benefit of and priority to U.S. Provisional Patent Application No. 63/330,048, filed on Apr. 12, 2022, the entire contents of which are herein incorporated by reference.

TECHNICAL FIELD

The present disclosure relates generally to systems and methods for providing a patch. More specifically, the present disclosure relates to a patch hangtag.

BACKGROUND

Hangtags are commonly attached to a product in order to convey information about that product, such as the price of the product, size of the product, names, logos, information regarding relevant promotions, the manufacture of the product, and the composition of the product. It is very common to find hangtags on products that are made out of fabric, such as clothing, outerwear, apparel, outdoor gear items.

Patches can be used for repairing tears or cuts in fabrics. Traditionally, patches used to repair tears or cuts in fabrics have been made from relatively heavy woven fabrics and have been sewn or stitched onto an item to repair it. Sewing or stitching patches onto certain items can weaken or otherwise degrade the item depending on the material that the item is made from. As such, self-adhesive patches have also been used to mend items that are made out of certain fabrics and materials. Self-adhesive patches may include an adhesive on one side of the patch, protected by a backing layer.

SUMMARY OF DISCLOSURE

This disclosure relates to a system for increasing the life of an outerwear garment. In some embodiments, systems may include an outerwear garment having an outer layer formed of a first material, and a hangtag that is attachable to the garment. The hangtag may include a patch made of the first material. The patch may be used for covering a hole, blemish, or imperfection, or other damage formed in the outer layer of the outerwear garment. The first material may include any suitable outdoor gear fabric and, in one configuration, could be denier nylon ripstop, etc.

This disclosure is also related to a method for extending the use of, for example, an outdoor gear item. This method may include providing the outdoor gear item (e.g., providing the gear item for sale) with a hangtag attachable to the outdoor gear item. In some embodiments, the hangtag includes a patch for repairing a hole formed in the outdoor gear item.

This disclosure is also related to a kit for an outdoor gear item. This kit may include the outdoor gear item and a hangtag removably attached to the outdoor gear item. The hangtag may include a patch for covering a hole formed in the piece of outdoor gear. The outdoor gear item may include one of a sleeping bag, a tent, a jacket, and a stuff sack.

In other aspects, benefits of the patches and/or hangtags for the patches include decorative and/or embellishment purposes. This allows a user to take an old garment and make it more stylish, or renew/update the look of the garment with a patch. The patch can also make the garment unique to the owner, allowing greater customization and creative expression.

Patches (either on a hangtag or applied to a garment) can additionally be used to transmit information, such as letters, words, numbers, QR codes, designs, symbols, patterns. This is beneficial in many ways, such as collecting end user data, complete life cycle analysis of products, advertising, tracking garments within the supply chain, locating and retrieving lost and found gear, listing military rank, etc.

BRIEF DESCRIPTION OF DRAWINGS

The drawings are illustrative and not limiting of the scope of the invention which is defined by the appended claims. The various elements of the invention accomplish various aspects and objects of the invention. Not every element of the invention can be clearly displayed in a single drawing, and as such not every drawing shows each element of the invention. The components in the drawings are not necessarily to scale relative to each other. Like reference numerals designate corresponding parts throughout the several views.

DETAILED DESCRIPTION

The following provides a detailed description of particular embodiments of the present invention. Reference will now be made to the drawings in which the various elements of the illustrated configurations will be given numerical designations and in which the invention will be discussed to enable one skilled in the art to make and use the invention. The description is only exemplary of the principles of the present invention, and should not be viewed as narrowing the scope of the claims which follow, which claims define the full scope of the invention.

The present disclosure relates generally to systems for providing a patch. The system for providing a patch may comprise a patch hangtag, which may comprise a hangtag with a patch attached, connected, or coupled thereto.

Figure 1:
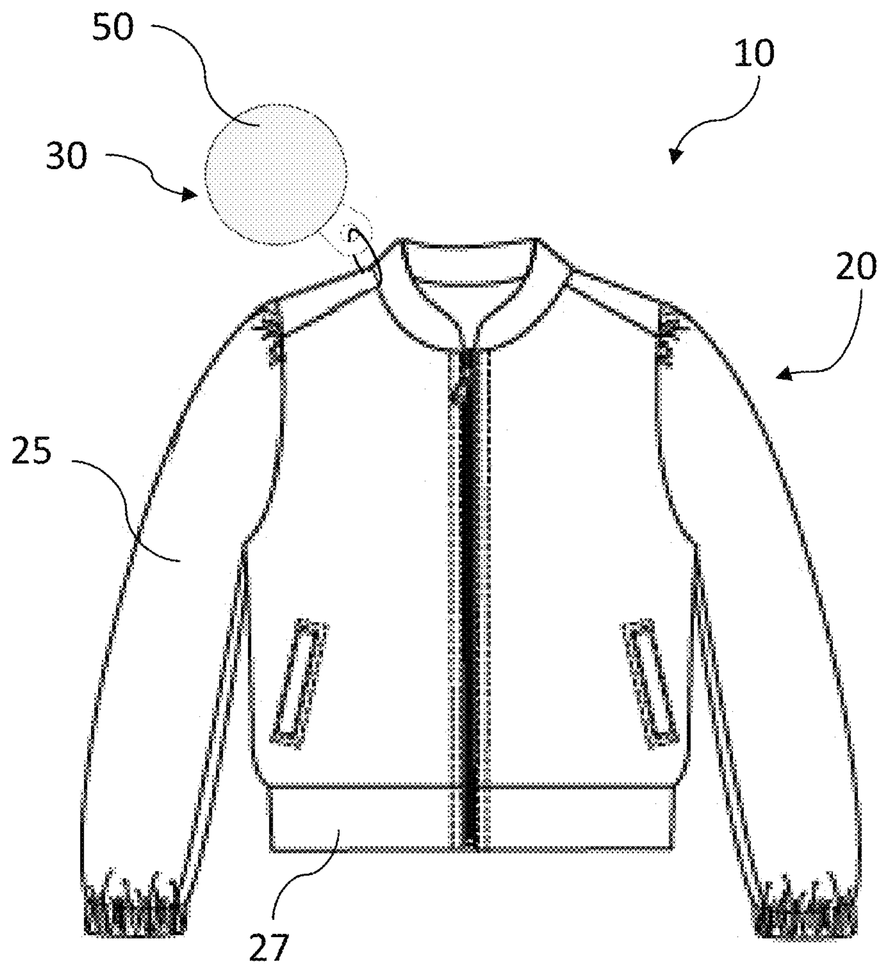
FIG. 1 is a perspective view of an embodiment of a system for providing a patch, according to the present disclosure.

Referring to FIG. 1, an exemplary configuration of an embodiment of a system 10 for providing a patch is shown. The system 10 may comprise a gear item 20 and a hangtag 30 with a patch 50. The patch 50 may be attached, connected to, or coupled to the hangtag 30. The hangtag 30 may be attachable, connectable, or coupleable—directly or indirectly—to the gear item 20. By way of example and not limitation, the hangtag 30 may be directly attachable to the gear item 20 such as by being physically attached to the gear item 20 with a plastic tag, a tether, or another type of fastener. The hangtag 30 can be physically attached to the gear item 20 at any appropriate and convenient location on the gear item 20 (e.g., by a neck of the item 20, as illustrated in FIG. 1). Alternatively, the hangtag 30 may be indirectly attachable to the gear item 20 by being packaged together with the gear item 20.

The gear item 20 may comprise any number of articles or items that comprise woven materials or fabrics and/or non-woven materials or fabrics, such as garments, apparel, clothing, purses, backpacks, bags, tents, sleeping bags, inflatable sleeping pads, inflatable mattresses, stuff sacks, other outdoor gear items, and the like. The gear item 20 may comprise an outer layer that is made out of a first material 25, which may be a fabric (e.g., woven or non-woven material). The first material 25 may comprise any number of materials depending on the intended use thereof, including but not limited to nylon (denier nylon ripstop), polyester, and polyethylene-based fabrics. For example, in some embodiments, the first material 25 can include nylon, ripstop nylon, ripstop fabrics, polyester, polyester blends, canvas, waterproofed fabric, merino wool, polartec polyester, Cordura, fleece, linen, canvas, cotton, Spandex waterproofed non-woven fabric, polyethylene-based fabrics, polyurethane-based fabrics, Gortex®, and/or combinations thereof.

In some embodiments, the gear item 20 and/or the outer layer of the gear item may comprise a second material 27. In some embodiments, the second material is different than the first material. In some embodiments, the second material can include elastic or stretchy materials, nylon, ripstop nylon, ripstop fabrics, polyester, polyester blends, canvas, waterproofed fabric, waterproofed non-woven fabric, polyethylene-based fabrics, polyurethane-based fabrics, Gortex®, and/or combinations thereof.

Figure 2:
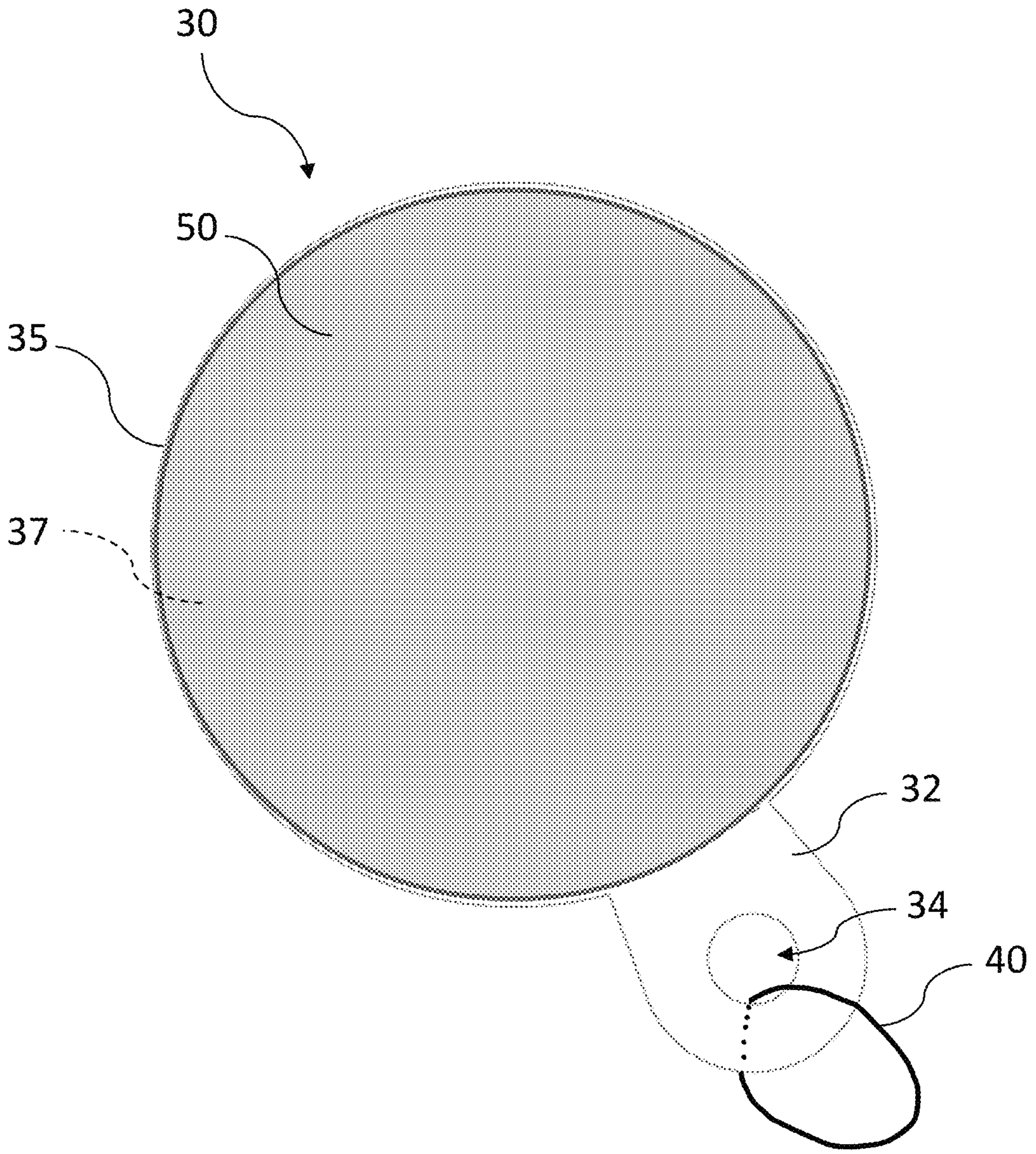
FIG. 2 is a top view of an embodiment of a patch hangtag.

Referring to FIG. 2, the hangtag 30 may comprise any number of materials that are suitable for use as a hangtag, such as a biodegradable, renewable, or otherwise recyclable material. The hangtag 30 may, for example, comprise materials such as paper, card stock, cardboard, or the like, and/or combinations thereof. The hangtag 30 may also comprise any number of shapes and sizes depending on the intended use thereof. FIGS. 1 and 2 illustrate, by way of example and not limitation, that the hangtag 30 may comprise a substantially circular shape with an extension or tab 32 that has a hole or eyelet 34 that extends through the hangtag 30, which may receive a plastic tag, a tether, or any other suitable type of fastener 40. In some embodiments, the patch 50 is attached to the hangtag 30 with a looped pin, metal wire, plastic, or string fastener 40, which fastener 40 may also attach the hangtag 30 to the garment or gear item.

In some embodiments, the hangtag 30 includes a body 35 having a first surface 37 for receiving the patch 50. In some embodiments, the body 35 may comprise a wax liner or wax-like material to facilitate removal of the patch 50 from the hangtag 30. In this way, the hangtag 30 may act as a backing material that holds the patch 50 and prevents any adhesive on the patch 50 from drying out or otherwise losing its adhesive properties until the patch 50 is removed from the hangtag 30. In some embodiments, the first surface 37 comprises the wax liner or wax-like material. In some embodiments, the body 35 and/or the first surface 37 is split or constructed from one or more pieces. Such multi-piece construction can facilitate easy removal of the patch 50 from the body 35, the first surface 37, and/or the hangtag 30.

A user can peel a first piece away from the patch 50 (or, alternatively, the patch 50 can be pulled away from the first piece) and place a first exposed portion of the patch 50 on, for example, the gear item 20. Once the patch has been positioned on the gear item 20, the user can then remove a second piece from the patch 50 (providing a second exposed portion of the patch 50) to completely secure the patch 50 to the gear item 20. In this way, the user can ensure the patch 50 is properly aligned over the damage, hole, etc. of the gear item 20 before finally securing the patch 50 to the gear item 20.

In some embodiments, the patch 50 can also have a front cover material, such as a clear plastic, to protect the front of the patch. Or, to reduce packaging, no front cover may be provided. Patch 50 may be made out of, or otherwise comprise, the first material 25 that the outer layer of the gear item 20 comprises, or a material that is substantially similar to the first material 25. In some embodiments, the patch 50 may comprise an adhesive patch that may be reversibly adhered to a first surface 37 of the hangtag 30. Any suitable patch 50, such as the patch described in U.S. Patent Publication 2018/0264781 (now U.S. Pat. No. 11,298,916), which is entirely incorporated by reference, can be used. The patch 50 may also comprise fabric (e.g., woven, non-woven, synthetic fabrics, etc.) opposite the adhesive, where the adhesive may be thicker than the fabric. In some embodiments, a thickness of the fabric of the patch 50 may range from approximately 0.001 to 0.01 inches, such as 0.0015, 0.002, 0.003, 0.004, 0.005, 0.006, 0.007, 0.009 inches, or a thickness within a range defined by any two of the foregoing values.

Figure 3:
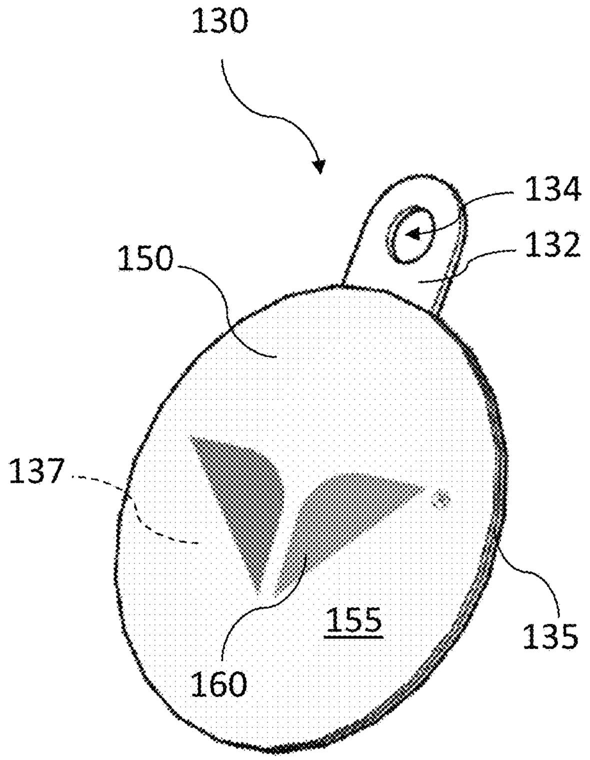
FIG. 3 is a perspective view of another embodiment of a patch hangtag.
Figure 4:
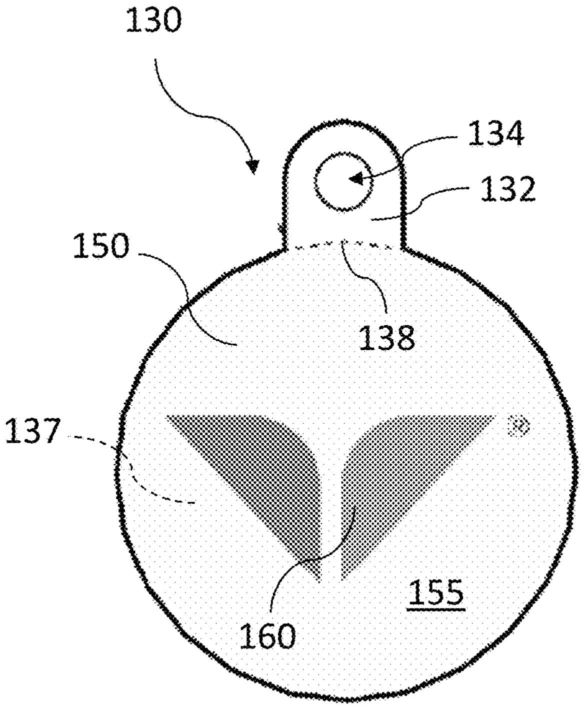
FIG. 4 is another perspective view of the patch hangtag of FIG. 3.
Figure 5:
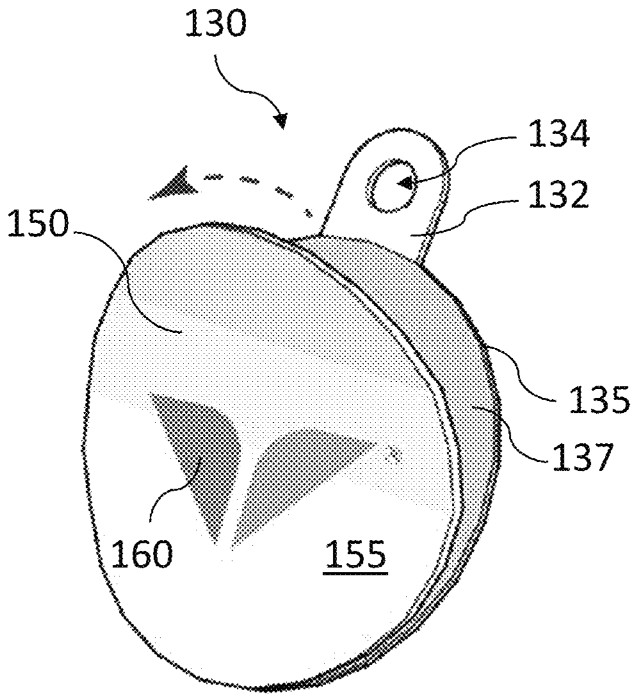
FIG. 5 is another perspective view of the patch hangtag of FIG. 3.
Figure 6:
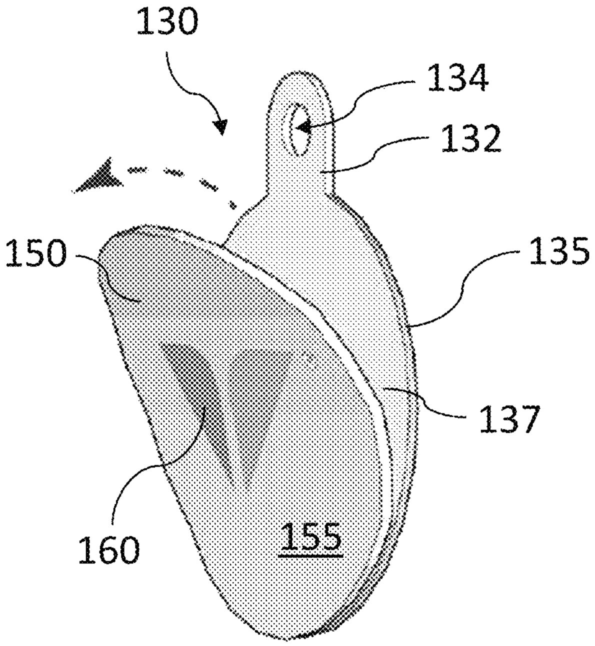
FIG. 6 is another perspective view of the patch hangtag of FIG. 3.
Figure 7A:
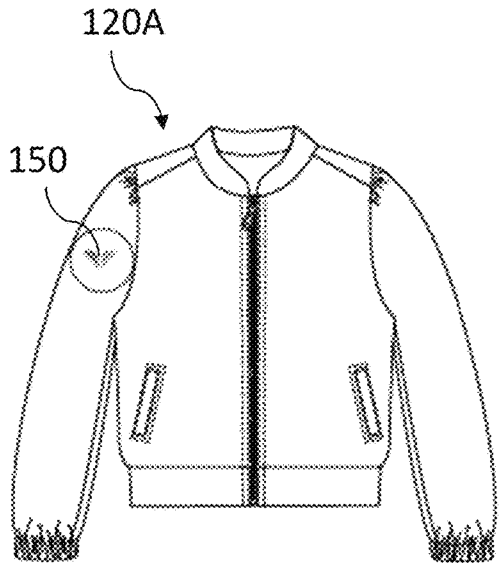
FIGS. 7A-7D depict the patch from the patch hangtag of FIG. 3 placed on various different items.
Figure 7B:
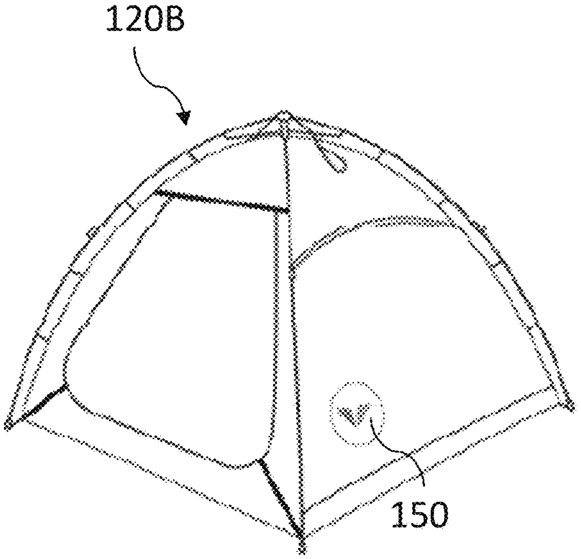
Figure 7C:
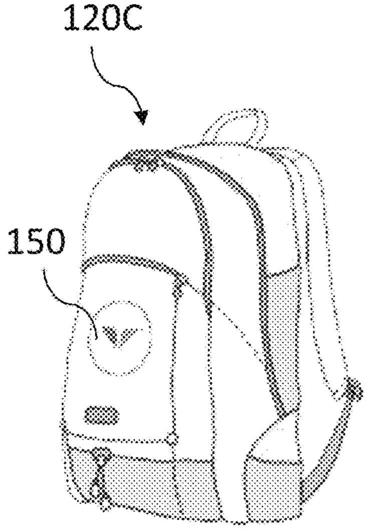
Figure 7D:
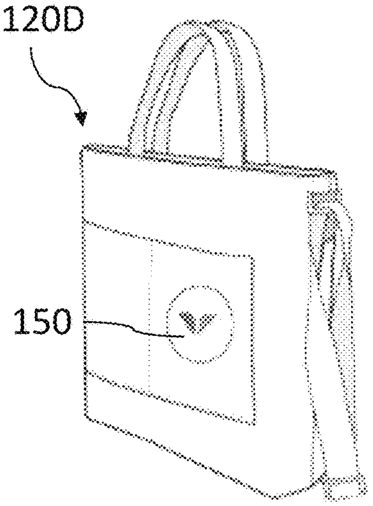

FIGS. 3-6 illustrate another embodiment of a hangtag 130, which may be used in connection with system 10. Hangtag 130 may be substantially similar to hangtag 30 and may comprise a patch 150 that is substantially similar to patch 50. Referring to FIGS. 3-4, a front surface 155 of the patch 150 may comprise indicia (e.g., a variety graphics, branding, advertising, or other information) 160 that is incorporated thereon. As illustrated in FIGS. 3-4, the information 160 may comprise a company's trademark, logo, or other promotional images. In some embodiments, the indicia 160 may be a QR code or other type of scannable barcode that would direct a user to data regarding product lifecycle analysis data, manufacturing location and origin data, pricing, date of manufacture, and/or product promotional data. In some embodiments, the QR code or other type of scannable barcode may drive or direct to a link associated with the QR code that links directly back to the manufacturer's website or any other URL on the internet. In some embodiments, the indicia 160 on the patch 150 can be used to increase corporate branding, generating further recognition in the sustainability market.

In some embodiments, the QR code or other type of scannable barcode may direct a user to company data information, like a hiking trail map or a ski area boundary trail map, and direct customers to data with the use of, for example, a smartphone. Additionally, QR code or other type of scannable barcode may hold lost and found address information within a computer database to help users locate lost gear and garments.

In some embodiments, the QR code or other type of scannable barcode may direct a manufacturing user to data such as repair, warranty and life cycle data on how long the product lasts. This may allow a manufacturer to design higher quality gear and garments after determining what lasts longest with the trackable QR codes.

FIG. 4 also illustrates that the hangtag 130 may comprise a perforated line 138 on the tab 132 that approximates a perimeter of the patch 150, which may facilitate removal of the patch 150 from the hangtag 130. The perforated line 138 may also facilitate removal of the tab 132 from a remainder of the hangtag 130 (e.g., the body 135).

Referring back to FIG. 1, a user may purchase or otherwise acquire the system 10 and begin using the gear item 20. The user may desire to remove the hangtag 30 (and the patch 50 attached to the hangtag 30) from the gear item 20 and store it in a storage compartment within the gear item 20 (e.g., a pocket) or elsewhere. Eventually, after using the gear item 20 for a period of time, the outer layer of the gear item 20—made out of the first material 25—may become damaged with a rip, tear, a scratch, or a hole. The user may then locate the hangtag 30, remove the patch 50 from the hangtag 30, and place the patch 50 on the outer surface of the gear item 20 over the damaged portion of the gear item 20. (See FIGS. 5-7.) Because the patch 50 may be made out of the same first material 25 that the outer surface of the gear item 20 is made out of, the patch 50 may be used to repair the damaged portion of the gear item 20 without detracting from the overall aesthetic impression of the gear item 20 and thereby extend the life and use of the gear item.

Referring again to FIGS. 5-7, another embodiment of system 10 may additionally, or alternatively, comprise a hangtag 130 and a patch 150. In such an embodiment, the user may selectively remove the patch 150 with the branding information 160 from the hangtag 130 (FIGS. 5 and 6) and place the patch 150 over the damaged portion of a gear item 120, such as a garment 120A, a tent 120B, a backpack 120C, or a bag 120D (FIGS. 7A-7D). In some embodiments, the patch 150 is sized and shaped to correspond to the damaged portion of the gear item 120. For example, if the damage to the gear item 120 is a hole, the patch 150 may be circular or substantially circular to cover the hole. As another non-limiting example, if the damage to the gear item 120 is a tear, the patch 150 may be linear or substantially linear to cover the tear. In some embodiments, the patch 150 may be manipulated by the user to correspond to the damage (i.e., through perforations in the patch 150 or a patch 150 including multiple pieces). In some embodiments, the patch 150 has a predetermined shape that corresponds with the damage. Because the patch 150 comprises branding information 160, the patch 150 may serve to repair the damaged portion of the gear item 120 and, at the same time, incorporate a new, visually appealing aesthetic impression into the gear item and thereby extend the life and use of the gear item 120.

Figure 8:
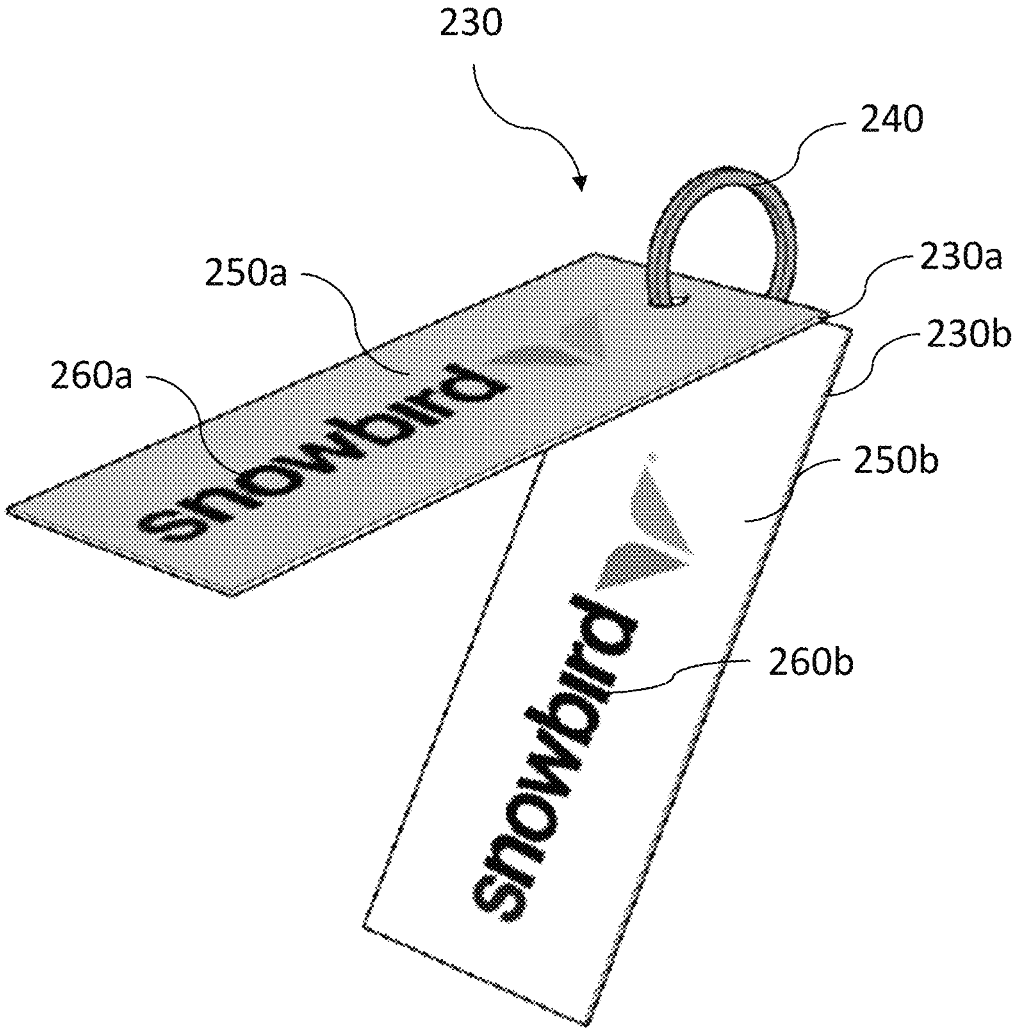
FIG. 8 is a perspective view of another embodiment of a patch hangtag.

FIG. 8 illustrates another embodiment of a hangtag 230. Hangtag 230 may comprise a first tag 230A and a second tag 230B, each of which may be substantially similar to hangtag 30. First tag 230A may comprise a first patch 250A, which may be substantially similar to patch 50. Second tag 230B may comprise a second patch 250B, which may be substantially similar to patch 50. First patch 250A may comprise a first material that corresponds with a first material of an outer surface of a gear item, and second patch 250B may comprise a second material that corresponds with a second material of an outer surface of the gear item. In this way, a user may use the first patch 250A to mend damaged portions of the outer surface of the gear item that are made out of the first material. And the user may use the second patch 250B to mend damaged portions of the outer surface of the gear item that are made out of the second material.

Figure 9A:
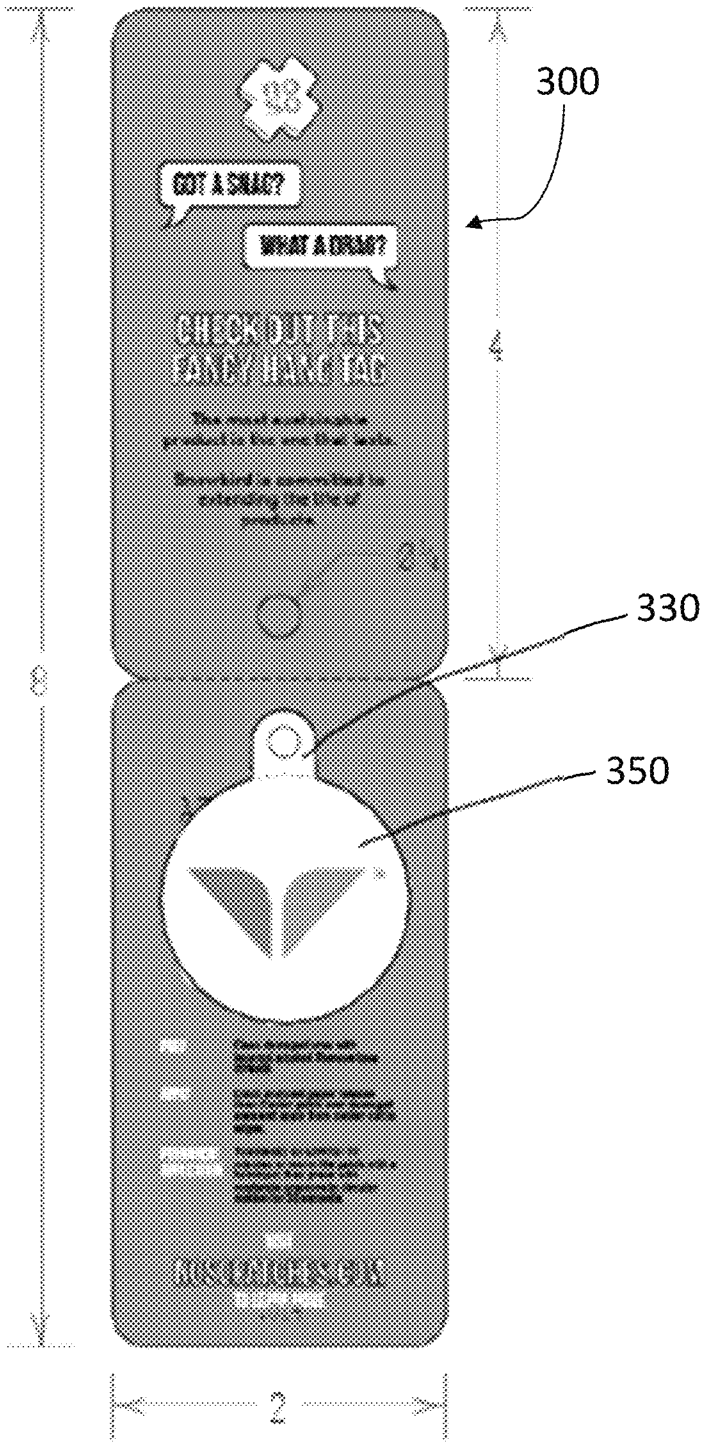
FIG. 9A is a top view and FIG. 9B is a perspective view of another embodiment of a patch hangtag, according to the present disclosure.
Figure 9B:
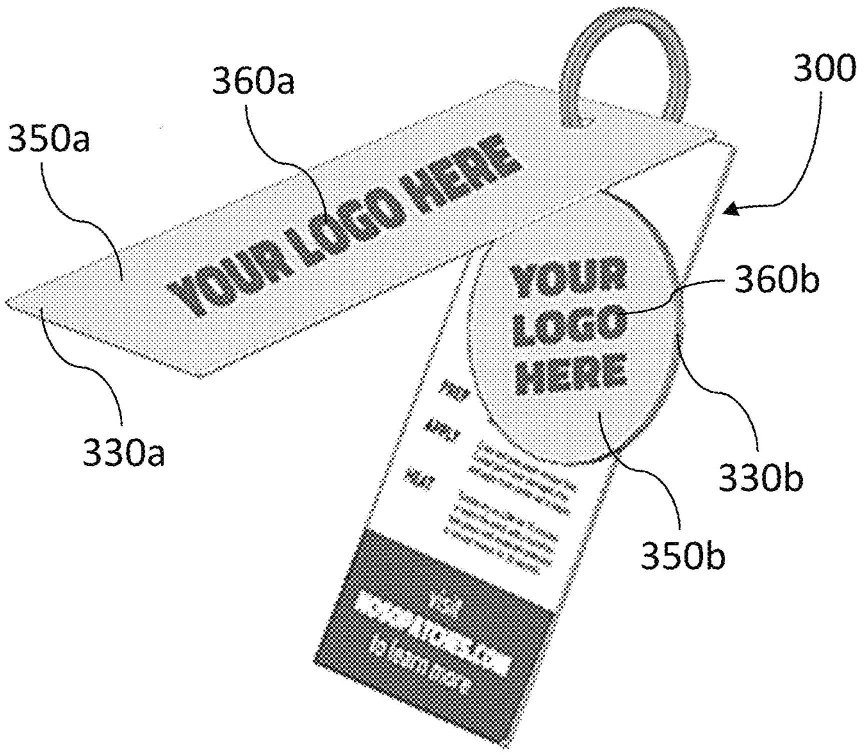

FIGS. 9A-9B illustrate an embodiment of a tag 300. Tag 300 may be made out of paper, card stock, cardboard or the like, which can be folded and can be attached to a gear item 20. For example, the tag 300 may be folded vertically, and the hangtag 330 (with the patch 350) is sandwiched between two pieces of the tag 300. The tag 300 can then be attached to a gear item or garment with a looped pin, metal wire, plastic, string, or other suitable fastener.

The tag 300 As shown in FIG. 9A, the tag 300 may further comprise a hangtag 330, which may be substantially similar to hangtags 30 and 130. The hangtag 330 may comprise a patch 350, which may be substantially similar to patches 50 and 150. The hangtag 330 may be reversibly attached to the tag 300. By way of example and not limitation, tag 300 may be folded around hangtag 330 so as to protect hangtag 330 and the patch 350 therein from being damaged.

The tag 300 may further comprise instructions for using the patch 350 on the hangtag 330. Instructions for applying the patch 350 to a gear item may include at least one of: cleaning a damaged area of a gear item with isopropyl alcohol; removing loose threads from the gear item; peeling patch 350 from hangtag 330; centering patch 350 over the damaged area of the gear item and applying the patch from its center out to its edges; tumble drying the gear item on LOW for a certain period of time (e.g. between 5 and 20 minutes) or warming the patch with a hair-dryer or other similar apparatus; and pressing down on the patch 350 over the gear item with moderate pressure in circular motion for a certain period of time (e.g. between 10 seconds and 2 minutes). The tag 300 and/or the hangtag 330 can include information and data useful to the consumer on all sides of the tag 300 and/or the hangtag 300.

As shown in FIG. 9B, the tag 300 may include two hangtags 330*a*, 330*b*, with each hangtag 330*a*, 330*b* being substantially similar to hangtags 30 and 130. As before, each hangtag 330*a*, 330*b* includes a patch 350*a*, 350*b*, which may be substantially similar to patches 50 and 150. In some embodiments, the patch 350*a* is of a different material than the patch 350*b*, allowing a user to cover and repair gear items including multiple different materials (e.g., a first material and a second material that is different than the first material). In some embodiments, the different materials of the patches 350*a*, 350*b* may correspond to different gear items that are typically packaged or used together. For example, patch 350*a* may be of a first material corresponding to a tent and patch 350*b* may be of a second material corresponding to a sleeping bag. In this way, a user can cover and repair blemishes in either gear item using the same tag 300.

In some embodiments, the patch 350*a* is the same material as the patch 350*b*, allowing a user to cover and repair multiple blemishes in the same gear item. In some embodiments, such as illustrated in FIG. 9B, each hangtag 330*a*, 330*b* (and each corresponding patch 350*a*, 350*b*) is of a different size and shape, allowing a user to cover and repair blemishes of different sizes and shapes in the gear item.

Figure 10:
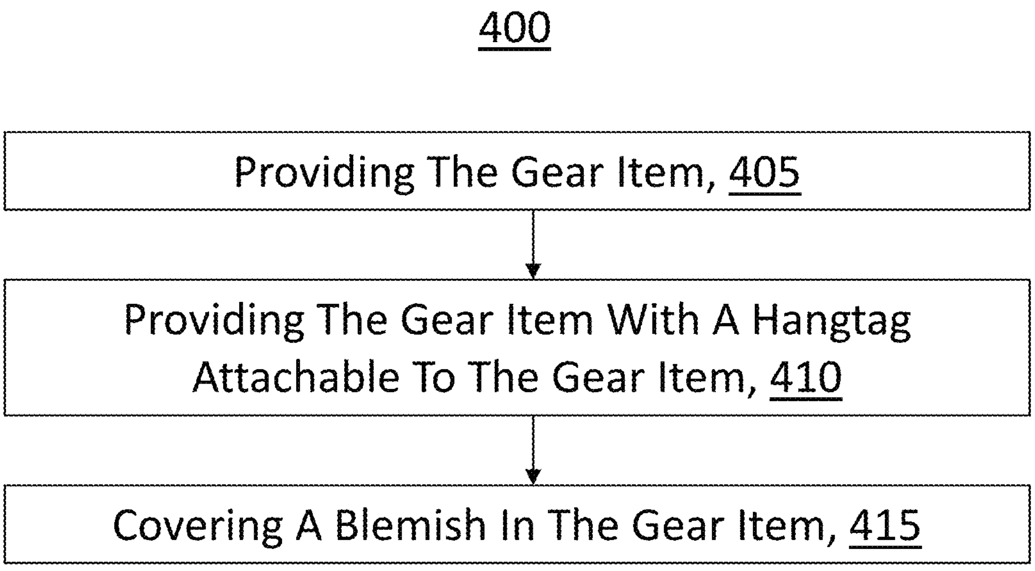
FIG. 10 is a flowchart of one configuration for a method for using the hangtag and/or prolonging the life of a gear item.

FIG. 10 illustrates a flowchart of an example method 400 for using the hangtag and/or prolonging the life of a gear item, according to the present disclosure. The method 400 can included providing the gear item, at 405, and providing the gear item with a hangtag attachable to the gear item, at 410. In some embodiments, the hangtag may be substantially similar to the hangtags 30, 130, and 330 described herein. The hangtag may be removably attachable to the gear item and may include a patch for covering a blemish in the gear item. The method 400 can further include covering a blemish in the gear item, at 415. In some embodiments, covering the blemish in the gear item includes removing a patch from the hangtag to expose an adhesive of the patch and placing the adhesive of the patch over the blemish formed in the gear item. The patch may include a fabric (e.g., a woven or non-woven fabric) opposite the adhesive, where the fabric is of the same material as the gear item.

Companies that offer the system 10 for providing a patch as described above may achieve various significant benefits, including obtaining greater brand visibility without the need to manufacture significantly more packaging than industry standard hangtags. By extending the life and use of various gear items, use of system 10 may also help to reduce the amount of textile products in landfills and reduce the carbon emissions associated with returns from warranty and repair claims by providing an elegant repair solution to more conveniently remedy rips, tares, and snags.

Other benefits of the patches and/or hang tags for the patches include decorative and/or embellishment purposes. This allows a user to take an old garment and make it more stylish, or renew the look with a patch. The patch can also make the garment unique to the owner.

Patches could be used to transmit information, such as letters, words, numbers, QR codes, designs, symbols, patterns. This is beneficial in many ways, such as collecting end user data, complete life cycle analysis of products, advertising, tracking garments within the supply chain, locating and retrieving lost and found gear, listing military rank, etc.

Throughout this description, various aspects discussed in one drawing may be present and/or used in conjunction with the embodiment shown in another drawing, and each element shown in multiple drawings may be discussed only once. The described features, structures, or characteristics of configurations of the invention may be combined in any suitable manner in one or more configurations. In some cases, detailed description of well-known items or repeated description of substantially the same configurations may be omitted. This facilitates the understanding of those skilled in the art by avoiding an unnecessarily redundant description. All statements herein reciting principles, aspects, and embodiments of the invention, as well as specific examples thereof, are intended to encompass equivalents thereof.

Reference in the specification to "one configuration" "one embodiment," "a configuration" or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

As used in this specification and the appended claims, singular forms such as "a," "an," and "the" may include the plural unless the context clearly dictates otherwise. Thus, for example, reference to "a patch" may include one or more of such patches, and reference to "the hangtag" may include reference to one or more of such hangtags.

As used herein, the term "generally" refers to something that is more of the designated adjective than not, or the converse if used in the negative. As used herein, the term "about" is used to provide flexibility to a numerical range endpoint by providing that a given value may be "a little above" or "a little below" the endpoint while still accomplishing the function associated with the range, for example, "about" may be within 10% of the given number or given range. As used herein, a plurality of items, structural elements, compositional elements, and/or materials may be presented in a common list for convenience. However, these lists should be construed as though each member of the list is individually identified as a separate and unique member.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 5 to about 60" should be interpreted to include not only the explicitly recited values of about 1 to about 5, but also include individual values and sub-ranges within the indicated range. Thus, included in this numerical range are individual values such as 6, 7, 8, 9, etc., through 60, and sub-ranges such as from 10-20, from 30-40, and from 50-60, etc., as well as each number individually. This same principle applies to ranges reciting only one numerical value as a minimum or a maximum. Furthermore, such an interpretation should apply regardless of the breadth of the range or the characteristics being described. Additionally, the words "attached," "connected," and "coupled" are used throughout for clarity of the description and can include either a direct connection or an indirect connection.

While methods are described herein in discrete steps in a particular order for the sake of clarity, the steps do not require a particular order and more than one step may be performed at the same time. For example, a later step may begin before earlier step completes. Or, a later step may be completed before an earlier step is started.

Although the foregoing disclosure provides many specifics, such as use of the system with a garment, it will be appreciated that other items of gear, such as tents, sleeping bags, other items of clothing, etc., are contemplated and these should not be construed as limiting the scope of any of the ensuing claims. Other embodiments and configurations may be devised which do not depart from the scopes of the claims. Features from different embodiments and configurations may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

Furthermore, if any references have been made to patents and printed publications throughout this disclosure, each of these references and printed publications are individually incorporated herein by reference in their entirety.

The invention claimed is:

1. A system for increasing a useable life of a garment, the system comprising:

a garment having an outer layer formed of a first material;

a tag attachable to the garment through a fastener, the tag comprising a paper-like material folded vertically over itself to create a first piece and a second piece, indicia corresponding to corporate branding, and indicia corresponding to instructions;

at least one hangtag disposed between the first and second pieces of the tag and removably attachable to the garment, the hangtag comprising a body, a tab extending from the body with a hole extending through the tab to removably attach the hangtag to the tag and the garment, a perforation between the body and the tab for removing the body of the hangtag from the tag and/or the garment, and a patch of the first material removably disposed on a first surface of the body of the hangtag, the patch for covering a hole formed in the outer layer of the garment, thereby increasing the life of the garment, wherein the body of the hangtag comprises at least one piece of wax liner to facilitate removal of the patch from the hangtag, wherein the patch is sized and shaped to cover the hole formed in the outer layer of the garment, wherein the patch comprises indicia corresponding to at least one of a logo and a QR code or other type of scannable barcode, the QR code or other type of scannable barcode for directing to data regarding sustainability of a brand and a lifecycle of the garment, wherein the hole extending through the tab of the hangtag aligns with a hole defined in each of the first and second pieces of the tag to thereby attach the hangtag and the tag to the garment, wherein a size and shape of the body of the hangtag is correlated to a size and shape of the patch, and wherein the indicia corresponding to instructions of the tab comprise instructions for covering the hole formed in the outer layer of the garment with the patch, thereby increasing the useable life of the garment.

2. The system of claim 1, wherein the first material comprises outdoor gear fabric, such as Gortex®, canvas, merino wool, polartec polyester, Cordura, fleece, linen, canvas, cotton, Spandex waterproofed fabric, waterproofed non-woven fabric, ripstop nylon, ripstop fabrics, polyester, polyester-blend fabrics, polyethylene-based, polyurethane fabrics, synthetic fabrics, or combinations thereof.

3. The system of claim 1, wherein the patch comprises an adhesive for attaching the patch to the outer layer of the garment and a heavily woven fabric opposite the adhesive, the heavily woven fabric including the indicia.

4. The system of claim 3, wherein the indicia further comprises one or more of: letters, words, numbers, a trademark, instructions for covering the hole with the patch, a QR code, brand or company information, and product information.

5. The system of claim 1, wherein the at least one hangtag further comprises a second hangtag having a body with a first surface for receiving a second patch, a tab, and a hole extending through the tab, the hole for receiving a fastener to attach the second hangtag to the tag and the garment.

6. The system of claim 1, wherein the garment has a second layer formed of a second material and the hangtag further comprises a second patch of the second material.

7. The system of claim 1, wherein the garment is one of a jacket, a shirt, or pants.

8. A method for extending the use of a gear item, the method comprising:

providing the gear item; and providing the gear item with a hangtag attachable to the gear item, the hangtag comprising a patch for covering a blemish formed in the gear item.

9. The method of claim 8, further comprising covering the blemish formed in the gear item, thereby extending the use of the gear item.

10. The method of claim 9, wherein covering the blemish comprises removing the patch from the hangtag to expose an adhesive of the patch and placing the adhesive of the patch over the blemish formed in the gear item.

11. The method of claim 10, wherein the adhesive of the patch is a waterproof adhesive.

12. The method of claim 8, wherein the patch comprises an adhesive for attaching the patch to the gear item and a fabric opposite the adhesive, the fabric being of a same material as the gear item.

13. The method of claim 12, wherein the fabric of the patch includes indicia comprising one or more of letters, words, numbers, a logo, a trademark, instructions for covering the blemish with the patch, a QR code, brand or company information, and product information.

14. The method of claim 12, wherein the adhesive of the patch is thicker than the fabric.

15. The method of claim 8, wherein the blemish formed in the gear item includes one or more of a scratch, a hole, a tear, a rip, or a stain and the patch is sized and shaped to match the blemish formed in the gear item.

16. A kit for an outdoor gear item, the kit comprising:

the outdoor gear item; and a hangtag removably attached to the outdoor gear item, the hangtag comprising:

a body having a first surface;

a patch for covering a hole formed in the outdoor gear item, the patch received by the first surface; and a tab extending from the body and defining a hole for receiving a fastener to removably attach the hangtag to the outdoor gear item.

17. The kit of claim 16, wherein the outdoor gear item comprises one of: a sleeping bag, a tent, a jacket, a backpack, a bag, and a stuff sack.

18. The kit of claim 16, wherein the body of the hangtag comprises wax and serves as a seal for an adhesive of the patch prior to placing the patch on the outdoor gear item.

19. The kit of claim 16, wherein the patch comprises an adhesive and a woven fabric opposite the adhesive, the adhesive being thicker than the woven fabric.

20. The kit of claim 19, wherein the outdoor gear item has a first material and the woven fabric of the patch is of the first material.

* * * * *